Patented Oct. 25, 1938

2,134,181

UNITED STATES PATENT OFFICE 2,134,181

METHOD OF PRODUCING METAL BONDED FRICTION MATERIAL

Harvey D. Geyer, Arthur H. Flower, and Dale M. Phillippi, Dayton, Ohio, assignors to General Motors Corporation, Detroit, Mich., a corporation of Delaware No Drawing. Application February 8, 1935, Serial No. 5,576

10 Claims. (Cl. 18—47.5)

This invention relates to friction materials such as are used as linings for brake bands or shoes; as facings for clutches and elsewhere in analogous relations.

An object of the invention is to secure a friction material better adapted for the purpose it is to serve, one having a coefficient of friction which will remain substantially constant even at high temperatures where other facings fail.

A second object consists in the attainment of the first by the use of an improved binder the composition of which will not change at high temperatures. Such changes tend to modify the coefficient of friction.

A more specific object consists in the process of making the friction material by certain novel steps including the association of asbestos fibre with a metal (preferably lead) or an alloy for a binder and with a lubricant such as graphite or an equivalent to obtain a desired coefficient of friction.

Other objects and advantages will be understood from the following description.

The novel friction material may perhaps best be described by setting forth the substances from which it is made and the process of its manufacture.

It is planned to use asbestos of a short length staple. The length of the fibre to be used is subject to wide variation. The asbestos is subjected to a dry fluffing process such as in a cotton picking machine or through a hammer mill. There is thus obtained a very fluffy fibrous mass which can be given the next treatment more efficiently. In some cases it may be expedient to give the material a wet ball or pebble-milling treatment. The ball-milling step tends to loosen adhering gritty particles from the fibre and may result in producing fibres of more uniform length. It also serves as a convenient way of incorporating with the asbestos fibres other ingredients such as carbon blacks or graphite.

The ball-milling step may be employed in addition to the fluffing step or as a substitute therefor. The nature of the compound and the ease of incorporating the various ingredients will determine which one or if both of these steps are to be used.

For the purpose of fluxing the metal at that point in the process where the dispersed metal is to be reunited under the influence of heat and pressure, it has been found advantageous to apply a minute quantity of a suitable flux to the asbestos fibres, in the form of a very thin but uniform film. The materials we have employed in this role are vegetable oils, synthetic derivatives, resins, and waxes. As specific examples of suitable substances which we have used, may be mentioned the butyl ester of polymerized ricinoleic acids, natural rosin, chlorinated diphenyl, and chlorinated naphthalene.

The quantity of such flux is held to a low limit, such as ½% by weight of the total friction composition, in order that the presence of this organic material may not interfere with the sterling friction characteristics attained by the use of an otherwise inorganic, heat-resistant formulation. In our selection of individual fluxing agents, we have been careful, moreover, to choose those which are known to offer relatively high resistance, among organic compounds, to decomposition by heat.

The method of applying the flux to the asbestos fibres is such as will insure the most uniform deposition. Obviously, so small a proportion of a wax, for instance, could not be so distributed by a mere mixing, even above the melting point of the wax. First, we fluff the fibre dry as already described, so that it presents the maximum surface for treatment. Then we make a dilute solution of the flux in a solvent which will have the property of "wetting" the asbestos; the solvent may be a mixture of toluol and alcohol, for example, in which case the alcohol portion contributes to the whole, the desired affinity toward the asbestos. The flux is present in the exact amount corresponding to the asbestos which is to be treated. The fibres are soaked in the solution; it is most economical to arrange for no more than sufficient solvent to reach all the fibres. The mass is next subjected to a concentration by evaporation in suitable equipment which provides for stirring and for protection against local overheating. The solvent should be recovered and used over again. When the fibres are once more completely dry, they are fluffed again as in the beginning. They are ready for the ensuing operations, the same as though they were in the untreated state.

Compositions made from asbestos bearing the flux have superior properties as to strength over those made from unfluxed fibre. Inasmuch as this fluxing step constitutes an improvement upon, rather than a fundamental part of, the invention, we do not wish to be required to employ this operation universally.

After the completion of the treatment of the asbestos as above, it is then washed by violent agitation in water and elutriation to remove any hard gritty particles.

Leaving for a moment the preliminary preparation of the asbestos, the preparation of the metal binder will be explained. At the present time it is believed to be best to use as the binder metallic lead of an alloy of which lead is the major ingredient. It is now believed that the most generally satisfactory lead alloy is one containing, in addition to the lead, ½% by weight of bismuth. In general, it is preferred to use an alloy in which lead predominates, but in which the properties of lead are modified by the presence of a small amount of another metal or metals for a net benefit in this particular use. In the later steps of the process the finely dispersed metal upon the asbestos fibres is subject to oxidation and the presence of the bismuth serves to decelerate that oxidation. The presence of the bismuth causes a slight lowering of the melting point but the lessening of the tendency toward oxidation overbalances the slightly lower melting point.

With reference to the alloy, it should be stated that others than lead-bismuth may be used. Lead-tellurium and lead-arsenic are suggested as substitutes for lead-bismuth.

To produce finely divided metal particles there has been employed a process closely resembling the process of making colloidal lead used by Bredig beginning at about 1898. In that process metal electrodes are placed beneath the surface of a liquid and the passage of an electric arc results in the ejection of particles of metal from the electrode into the liquid medium. The particles vary in size from truly colloidal to coarse grains, depending upon the electrical conditions. In the preparation of pure colloidal solutions the coarser material is filtered off. For the present purpose it is preferred to retain not only the colloidal particles but also that portion of the disintegrated metal which approaches the colloidal state, particles which are sufficiently minute so that they remain in suspension in water for some hours. The electrical conditions are arranged so that of the disintegrated metal only a very small part is coarse and requires reworking. Almost all is serviceable for use as a binder for the asbestos. It is now believed that a voltage of 20 to 30 and a current of 80 to 100 amperes will well serve the purpose. Obviously the process may be worked with either direct or alternating current and various means may be used to produce the arc, including mechanical make and break and other devices. Other metals are, of course, subject to this treatment but lead and its alloys are now believed to be well suited for the present purpose. It is not necessary to use two electrodes of the same metal. Good results are secured by using one electrode of lead or an alloy of lead and the other of copper. The lead is consumed predominantly and the copper is only very slowly worn away. The water should be of rather high purity. Steam condensed in a block tin coil and preserved in glass or tin lined containers is being used. The arcing chamber may be a porcelain enameled pan. The lead remains in suspension as described above and the particles carry a positive charge as has been determined by cataphoretic experiments. If rather impure water, such as ordinary tap water, is used, flocculation occurs and the metal settles, leaving a clear supernatant liquid. This material is not entirely useless but a fully dispersed metal is better and makes a better binder which will deposit in a thin continuous film about the individual fibres of asbestos in the next step of the process.

The next step consists in the application of the lead to the asbestos. The asbestos fibre has been put into condition as described above and is now in suspension in water. The mixture is agitated and to it is added the water carrying the metal in suspension in a suitable predetermined quantity. Agitation of the fibre and metal is sufficient for extraction of the metal by the fibre up to a certain amount. To produce better coagulation of the suspended metal it has been found best to introduce, during the agitation, carbon dioxide gas or an equivalent which yields precipitating ions. In this way a more compact and firmly bound coating is attached to the asbestos fibres. Thus coated, the fibres settle readily and leave clear water with no appreciable metal content. If examined under the microscope the fibres are seen to be covered with deposited metal particles.

The coefficient of friction of asbestos fibre and metallic lead or alloys in which lead predominates is much the same. It is 0.70 and upward. This is too high for clutch and brake shoe facings as now designed. To bring the coefficient down it is proposed to add a modifier, such as some carbonaceous material, amorphous or finely ground flake graphite for example. Hydrocarbon residues such as carbon blacks, bone blacks and lamp blacks may be used. By the addition of finely ground amorphous graphite a workable coefficient of friction of 0.35 to 0.45 has been obtained when working against a cast iron surface. The percentage of graphite may vary between quite wide limits. It is now believed that relatively small percentages of graphite as from 5% to 20% may be most desirable.

Soft amorphous graphite is susceptible to deflocculation by the addition of a basic reagent such as ammonia. It may be found desirable to employ such a step in the process. By the use of such a deflocculating agent it is possible to get a more intimate mixture of the graphite with the other ingredients. The carbonaceous material may be added at various points in the process. It may be ground with the asbestos in the preliminary treatment of the latter; it may be added during the agitation of the asbestos before the introduction of the metal in suspension; or it may be added after the metal has been deposited on the asbestos fibres. It is preferred to coat the fibre with the carbon before the addition of the metal.

The description has now reached the stage where the asbestos fibres loaded with metal and the modifying agent are allowed to settle in the water. The water is now removed first by decanting and then by draining on a screen either with or without vibration. The resultant slimy mass is carefully placed in a suitable preforming apparatus and subjected to pressure with provision for the escape of more water. These operations shall be carried out as expeditiously as possible to avoid oxidation. The preformed material still carries considerable water which must be removed before molding. To avoid oxidation of the deposited metal the drying operations are conducted in an atmosphere of some non-oxidizing gas. Such a gas may be nitrogen, or carbon dioxide. More recently there has been used a complex mixture resulting from the combustion of methane in an enclosed externally heated tube in the presence of a catalyst. Variations in this process of the combustion of methane, including variations in the temperatures and also variations in the proportion of air to methane, may be employed to secure reducing atmospheres of high hydrogen and carbon monoxide content or merely neutral atmospheres composed largely of oxides of carbon and residual nitrogen.

The dried preform is next molded in an appropriate mold of the follow-up type, provided with means for heating to a temperature safely above the melting point of lead or such other metal as is being used for a binder. The limits of pressure and temperature in this molding step may be varied as necessary. The time for properly molding is determined by the rate of heating. Since no chemical reaction is involved the time of molding is determined by the rate of heat transfer. The object is, of course, to cause a reunion of the finely divided metal particles. After the temperature of the mold is reduced somewhat below the melting point of the metal binder, the molded parts may be removed and finished for use by resort to such usual operations as surface grinding, drilling and countersinking for rivets, etc.

Friction materials made by the above process give remarkably uniform results. It has been found that the coefficient of friction tends to rise slightly when the material is subjected to a temperature of from 400 to 600° F. This is itself a measure of the value of material so made because ordinarily clutch facings and brake linings suffer a loss of their coefficient of friction when subjected to a temperature of 350 to 400° F. It also is an important characteristic that the materials made by this novel process show very uniform coefficients on the second and third heat test runs, differing in this respect from the heretofore commercial materials which change greatly in their coefficients when subjected to successive heat test runs.

Friction material processed as above will afford a uniform coefficient of friction throughout a very great range of temperature, and this for the reason that in its composition there are no significant amounts of any material which are affected by continuous or elevated heat treatment. Its wearing qualities are very good.

A typical example of the proportion of a composition according to this invention follows:

|  | Per cent by weight |
|---|---|
| Short fibre asbestos | 50 |
| Hard amorphous graphite | 15 |
| Lead including ½% bismuth | 35 |

Pressure in making the preform may be 2000 lbs. per square inch. Pressure and temperature in molding may be 16,000 lbs. per square inch with a top temperature of 720° F.

If desired, any preferred filler may be added for reducing the cost of the product. Such a filler should be one which does not materially change the frictional properties of the material nor sacrifice the desirable characteristics above outlined.

In the claims following this description the word "lead" is used to mean either metallic lead per se or an alloy in which lead is the major part.

We claim:

1. The process of making friction material as for clutches and brakes comprising preparing fluffy asbestos fibres free from grit and in liquid suspension, preparing colloidal lead in liquid suspension, mixing the said liquids, adding carbon dioxide gas or the like to supply precipitating ions and agitating the mixture, removing the water, making of the residue a preform, pressing the preform to remove retained water and thereafter molding the preform under pressure and at a temperature such as to fuse the lead to make of it a binder for the asbestos fibres.

2. The invention defined by claim 1 with the performance of the drying of the preforms in an atmosphere of non-oxidizing gas.

3. In the process of making friction elements for clutches and brakes, the steps which comprise mixing a mass of mineral fibres with a sufficient amount of lead in the form of finely divided and unfused particles in water suspension to coat the individual fibres with the lead, heating the coated fibres to a temperature sufficient to fuse the lead thereby binding the fibres, and forming the mixture of fibres and lead into friction elements for clutches and brakes.

4. In the process of making friction elements for clutches and brakes, the steps which comprise mixing a mass of mineral fibres with a sufficient amount of metal in the form of finely divided and unfused particles in water suspension to coat the individual fibres with the metal, subjecting the coated fibres to temperature and pressure conditions sufficient to fuse the metal thereby binding the fibres, and forming the mixture of fibres and metal into friction elements for clutches and brakes.

5. In the process of making friction elements for clutches and brakes, the steps which comprise mixing a mass of mineral fibres with carbonaceous lubricant and with a sufficient amount of lead in the form of finely divided and unfused particles in water suspension to coat the individual fibres with the lead, subjecting the coated fibres to temperature and pressure conditions sufficient to fuse the lead thereby binding the fibres, and forming the mixture of fibres, lubricant and lead into friction elements for clutches and brakes.

6. In the process of making friction elements for clutches and brakes, the steps which comprise treating a mass of mineral fibres with a metal fluxing agent so as to apply the fluxing agent to the individual fibres, mixing the mass of fibres with a sufficient amount of metal in the form of finely divided and unfused particles in water suspension to coat the individual fibres with the metal, subjecting the coated fibres to temperature and pressure conditions sufficient to fuse the metal thereby binding the fibres, and forming the mixture of fibres and metal into friction elements for clutches and brakes during the fusing of the metal.

7. In the process of making friction elements for clutches and brakes, the steps which comprise mixing about 50% by weight of asbestos fibres with about 15% by weight of amorphous graphite and with about 35% by weight of lead in the form of unfused finely divided particles in water suspension to coat the individual fibres with lead and graphite, subjecting the coated fibres to temperature and pressure conditions sufficient to fuse the lead thereby to bind the fibres, and molding the mixture of fibres, graphite and lead into friction elements for clutches and brakes during the fusing of the lead.

8. In the process of making friction material as for clutches and brakes, the steps which comprise mixing a mass of mineral fibres with a sufficient amount of colloidal metal in liquid suspension to coat the individual fibres with the metal, removing the liquid, drying the residue of coated fibres, and subjecting the dried coated fibres to sufficiently high temperature and pressure conditions to fuse the metal and bind the mineral fibres, thereby forming a compact friction material.

9. In the process of making friction material as for clutches and brakes, the steps which comprise mixing a mass of mineral fibres with a sufficient amount of colloidal lead in water suspension to coat the individual fibres with the lead, removing the water, drying the residue of coated fibres in a non-oxidizing atmosphere, and molding the dried coated fibres under pressure at a temperature sufficient to fuse the lead, thereby binding the fibres and forming a compact friction material.

10. In the process of making friction material as for clutches and brakes, the steps which comprise preparing in water suspension a mass of asbestos fibres, mixing therewith a sufficient amount of colloidal lead in water suspension to coat the individual fibres when the lead is precipitated, supplying precipitating ions and agitating the mixed liquids thereby precipitating the lead and coating the individual fibres with lead, removing the water, drying the residue of coated fibres, and subjecting the dried coated fibres to temperature and pressure conditions sufficient to fuse the lead and thereby bind the asbestos fibres.

HARVEY D. GEYER.
ARTHUR H. FLOWER.
DALE M. PHILLIPPI.